June 24, 1969        R. W. FURROW        3,451,468

MOTOR VEHICLE CLIMATE CONTROL SYSTEM

Filed Jan. 25, 1968        Sheet 1 of 3

INVENTOR.
Roger W. Furrow
BY
John R. Faulkner
E. Dennis O'Connor
ATTORNEYS.

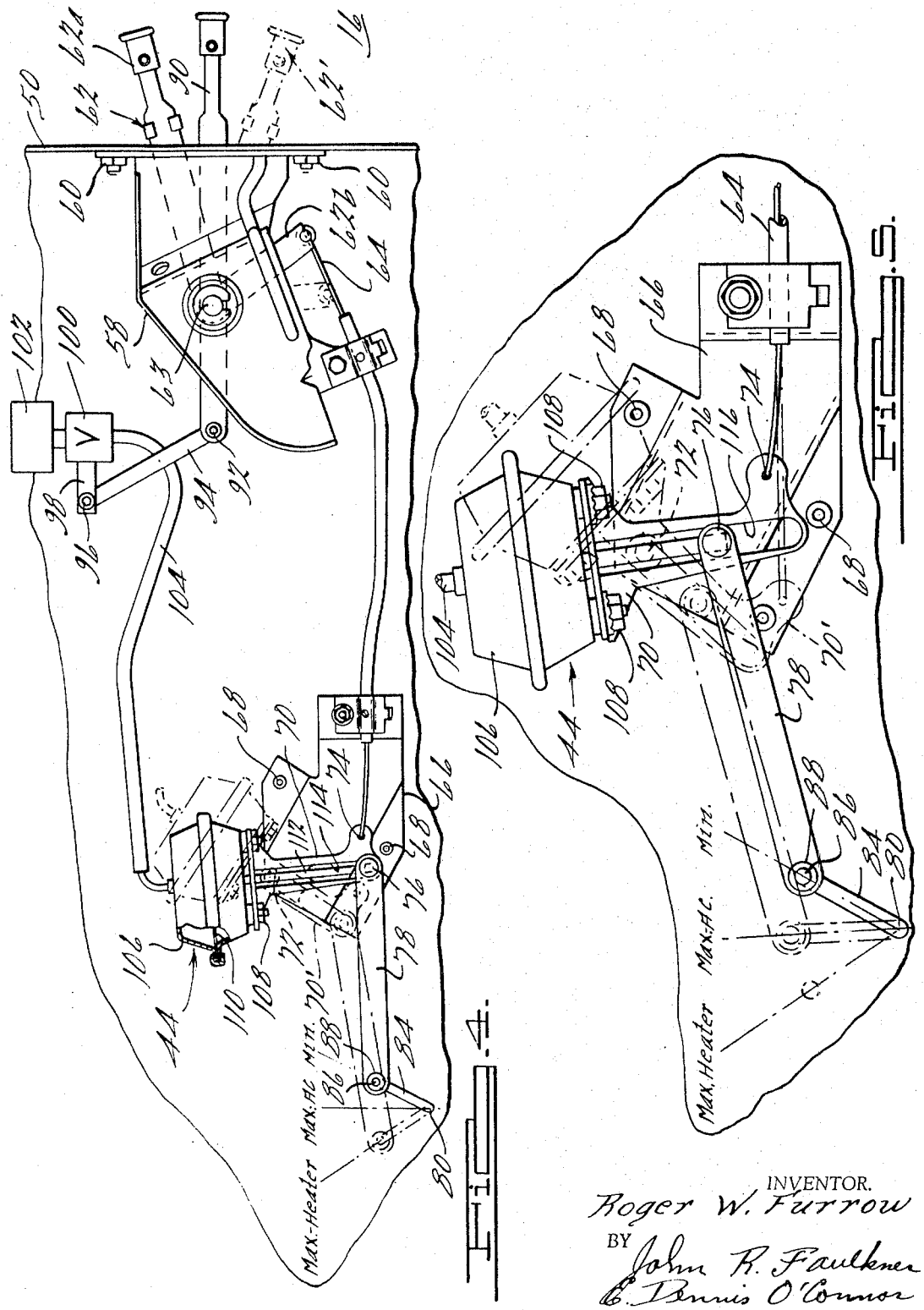

United States Patent Office 3,451,468
Patented June 24, 1969

3,451,468
MOTOR VEHICLE CLIMATE CONTROL SYSTEM
Roger W. Furrow, Roanoke, Va., assignor to Ford Motor Company, Dearborn, Mich., a corporation of Delaware
Filed Jan. 25, 1968, Ser. No. 700,635
Int. Cl. F25b 25/00; B60h 3/04, 1/06
U.S. Cl. 165—23                                             10 Claims

ABSTRACT OF THE DISCLOSURE

A motor vehicle climate control system wherein the volume of air exposed to either air heating or air cooling means is controlled by a valve. A manually operable temperature control lever controls movement of the valve and is connected thereto by an adjustable mechanical linkage. Manually operable linkage adjustment means are provided so that the ratio of control lever movement to valve movement can be varied to accommodate the different temperature ranges encountered in the operation of the climate control system to either heat or cool the vehicle.

Background of the invention

A type of motor vehicle climate control system currently marketed includes a manually operable temperature control lever mounted on the vehicle instrument panel. Movement of this lever results in a movement of valve means that determine the volume of air exposed to either air heating means, such as a heater core, or air cooling means, such as an air conditioner condenser. Movement of the temperature control lever from one of its extreme positions to the other involves a movement of approximately four inches.

During periods of low ambient temperatures, during which a vehicle operator desires heated air to be introduced into the passenger compartment by the vehicle climate control system, e.g., a temperature of 30° F., it has been found that the population of vehicle operators desires an input of air into the passenger compartment at temperatures ranging from 50° F. to 150° F., depending on instant circumstances and personal preferences. To obtain heated air within such a range of temperatures, the vehicle operator can position the temperature control lever at some point along substantially the entire four-inch length of possible lever movement. This four-inch temperature adjustment capability provides for a satisfactory fine adjustment characteristic of the temperature control lever during air heating periods.

During periods of high ambient temperatures, during which a vehicle operator desires cool air to be introduced into the passenger compartment, e.g., a temperature of 90° F., it has been found that the population of vehicle operators desires an input of air into the passenger compartment at temperatures ranging from 40° F. to 80° F. (This desired temperature range of 40° when the climate control system air cooling means are in operation compares to the desired temperature range of 100° during air heating periods.) To obtain cooled air within such a range of temperatures, the vehicle operator is limited as to the position of the temperature control lever. For temperatures of from 40° F. to 80° F., the control lever must be positioned along a portion of the length of possible lever travel extending for approximately one inch.

This relatively extreme sensitivity of the temperature control lever during air cooling periods prevents this control from having a satisfactory fine adjustment characteristic during air cooling. It thus is difficult for the vehicle operator to position the control lever at a desired setting without numerous adjustments thereof, since a control lever movement of small length results in a large change in the temperature of input air directed into the passenger compartment.

An object of this invention is to provide a vehicle climate control system similar to that described above, but wherein the fine adjustment characteristic of the temperature control lever during periods of air cooling is similar to said characteristic during periods of air heating. This object demands that the temperature control lever can be positioned over the substantial length of possible lever movement for the direction of cooled air within the desired temperature range to the vehicle passenger compartment.

Summary of the invention

A motor vehicle climate control system constructed in accordance with this invention includes duct means defining a first air passage having air heating means positioned therein and a second air passage having air cooling means positioned therein. Both of these passages are operatively connected to a common source of pressurized air. Valve means are secured to said duct means and regulate the volume of air flowing through each of said passages. The valve means include a movable valve plate, a manually operable temperature control lever mounted on the vehicle instrument panel and adjustable linkage means interconnecting the control lever and the valve plate. The linkage means have a first position such that a predetermined movement of the control lever causes a first movement of the valve plate and a second position wherein the same predetermined movement of the control lever causes a second movement of the valve plate that is smaller than the first valve plate movement. Adjustment means, operably connected to both the linkage means and the air cooling means, are included to urge the linkage means from the first position to the second position upon the activation of the cooling means.

Description of the drawings

FIGURE 4 is a plan view of the temperature control apparatus of the climate control system of FIGURE 1 during periods when air heating is desired;

FIGURE 5 is an enlarged view of a portion of the apparatus of FIGURE 4 during periods when air cooling is desired.

Detailed description of the invention

Figure 1:
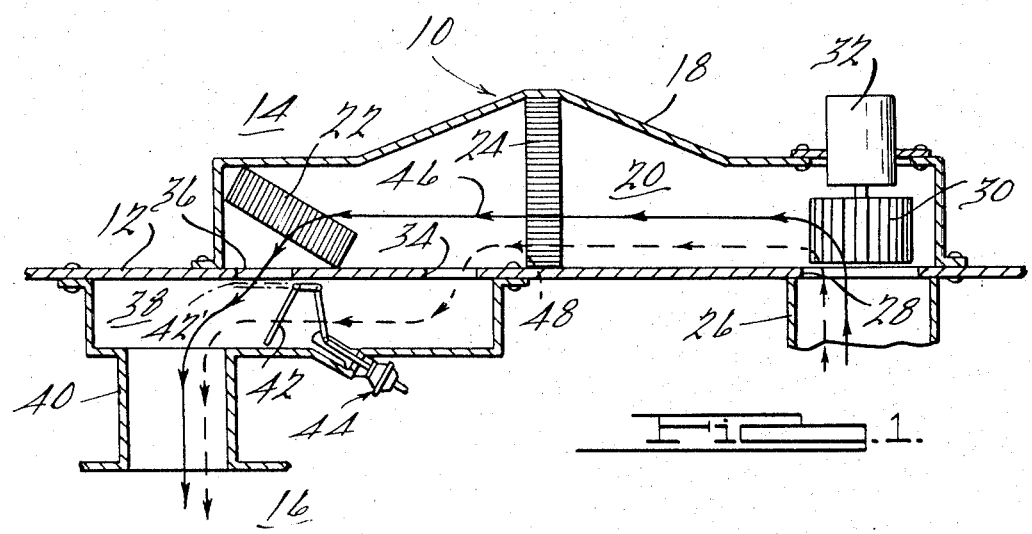
FIGURE 1 is a schematic representation of a portion of a motor vehicle climate control system constructed in accordance with this invention.

Referring now in detail to the drawings and in particular to FIGURE 1 thereof, the numeral 10 denotes generally the motor vehicle climate control system of this invention that is arranged about the fire wall 12 of a vehicle, said fire wall dividing a vehicle engine compartment 14 from a passenger compartment 16. A duct member 18, secured to fire wall 12 within engine compartment 14, cooperates with fire wall 12 to define an air treating chamber 20. Air heating means, such as a continuously operable heater core 22, and air cooling means, such as an intermittently operable air conditioner evaportor 24, are positioned as illustrated within chamber 20. An air input manifold 26 registers with an opening 28 in fire wall 12 to allow air to enter chamber 20. Manifold 26 may be connected to a source of fresh air such as vents in the vehicle cowl and/or the passenger compartment 16, the latter to provide for air recirculation through system 10.

Air pressurizing means such as a cage fan 30, driven by an electric motor 32, are positioned proximate to opening 12 to drive air from manifold 26 through chamber 20 and out either or both of openings 34 and 36 formed through fire wall 12. Air exiting chamber 20 via openings 34 and 36 is directed through the air exhaust chamber 28 partially defined by duct work 40 and into passenger compartment 16.

Within exhaust chamber 38 is positioned a valve plate 42 (FIGURES 1 and 3) that is movable from the position shown in solid lines to the position 42' illustrated in phantom. The mounting and motivation of valve plate 42 will be described in detail below. A portion of the valve control apparatus is denoted generally by the numeral 44.

From FIGURE 1 and the foregoing description, it may be seen that when maximum heat is desired within passenger compartment 16, valve plate 42 is positioned as illustrated in solid lines effectively blocking opening 34 so that all air driven through chamber 20 exits this chamber via opening 36 after having been heated by continuously operable heater core 22. (Evaporator 24 is inoperable at this time.) If less than maximum heat is desired the valve plate is positioned between the positions 42 and 42' so that only a portion of the air driven through chamber 20 is heated. The passage for heating air is indicated by the solid arrow 46 of FIGURE 1.

When maximum cooling within passenger compartment 16 is desired, evaporator 24 is activated and the valve plate positioned as at 42', thus effectively blocking opening 36 so that cooled air, after passing evaporator 24, will exit chamber 20 by opening 34. The passage for cooling air is indicated by the broken line arrow 48 of FIGURE 1. If less than maximum cooling is desired, the valve plate is positioned between the positions 42 and 42' so that a portion of the air cooled by condenser 24 subsequently is heated by heating core 22 and passes through opening 36. It readily may be appreciated that a small movement of the valve plate from the position 42' will cause a significant rise in the temperature of air passing into compartment 16.

Figure 2:
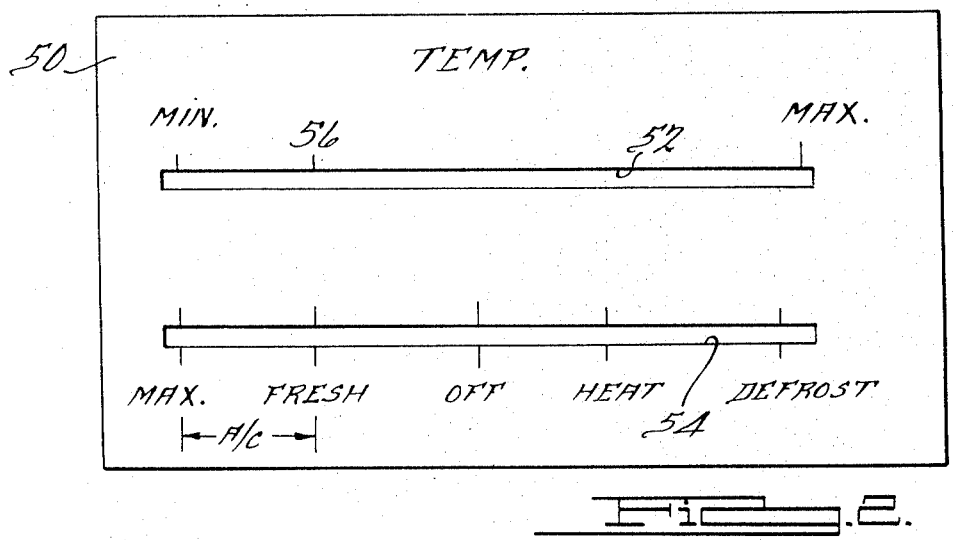
FIGURE 2 is an illustration of the control panel of the climate control system of FIGURE 1.

The system of FIGURE 1, with the exception of the valve control apparatus 44, is a conventional vehicle climate control arrangement. A suitable control panel for such an arrangement is illustrated by FIGURE 2 and includes a legend panel 50 mounted on a vehicle instrument panel and having slots 52 and 54 extending therethrough to permit manually operable control levers to extend into the vehicle passenger compartment. (These levers are not illustrated in FIGURE 2 for purposes of clarity.) Conventionally, and according to this invention, the lever extending through slot 52 is mechanically joined to valve plate 42 to control movement of the valve plate and the lever extending through slot 54 is operably connected for activation and deactivation of the air cooling means (evaporator) 24 as well as deflecting means (not shown) that register with duct work 40 and operate to direct air at the floor of passenger compartment 16 and/or against the vehicle windshield for defrosting purposes. When the lever passing through slot 54 is positioned to the right of the "OFF" position, evaporator 24 is inoperable while the evaporator is operable when the lever is positioned to the left of the "OFF" position.

In conventional systems of this type, when the air cooling means are inoperable, the lever passing through slot 52 may be moved from the "MIN" (minimum temperature) position, wherein ambient air enters the passenger compartment since the valve plate is in the position 42', to the "MAX" (maximum temperature) position, wherein the valve plate is in the position 42 and air coming into the passenger compartment has a mean temperature of approximately 150° F. This range of possible lever positions provides for a satisfactory fine adjustment characteristic for this control when heated air is desired.

When air cooling is desired and condenser 24 is operable, minimum temperature air is directed by positioning the lever extending through slot 52 to the "MIN" position (valve plate in position 42'). Movement of the lever away from the "MIN" position to a position designated approximately by the numeral 56 results in air at 80° F. entering the passenger compartment. As set forth above, it has been found that 80° F. is the highest temperature desired by the population of vehicle operators during air cooling periods. The narrow range of possible temperature lever adjustments between "MIN" and the numeral 56 limits the fine adjustment characteristic of this control to an unsatisfactory level. This problem is not present in the climate control system of this invention, however, due to the unique connection of the two control levers to other elements of the system. This feature of the invention best may be appreciated by reference to FIGURES 3–6 of the drawings.

From FIGURE 4 it may be seen that the surface of panel 50 remote from passenger compartment 16 has a mounting bracket 58 secured thereto by fasteners 60. A temperature control lever 62 is pivotally connected to post 63 extending from bracket 58. Lever 62 is essentially L-shaped and has one of its legs 62a extending through slot 52 of panel 50 and the other of its legs 62b secured to a power transmitting Bowden wire 64. Lever 62 is illustrated in the "MAX" position. The phantom representation of this lever designated 62' represents the orientation of the lever at the "MIN" position.

The valve control apparatus designated by the numeral 44 in FIGURE 1 involves a mounting plate 66 that is secured to duct work 40 by rivets 68. A lever 70 is pivotally connected to plate 66 at point 72. The end of Bowden wire 64 remote from lever arm 62b is secured to lever 70 at point 74. It thus may be seen that a manual movement of lever 62 results in a corresponding pivotal movement of lever 70 about pivot point 72. Lever 70 and its attendant structure to be discussed below are illustrated in the position corresponding to the "MAX" position of temperature control lever 62 while the phantom illustration at 70' shows lever 70 in the position corresponding to the position 62' of lever 62.

Figure 3:
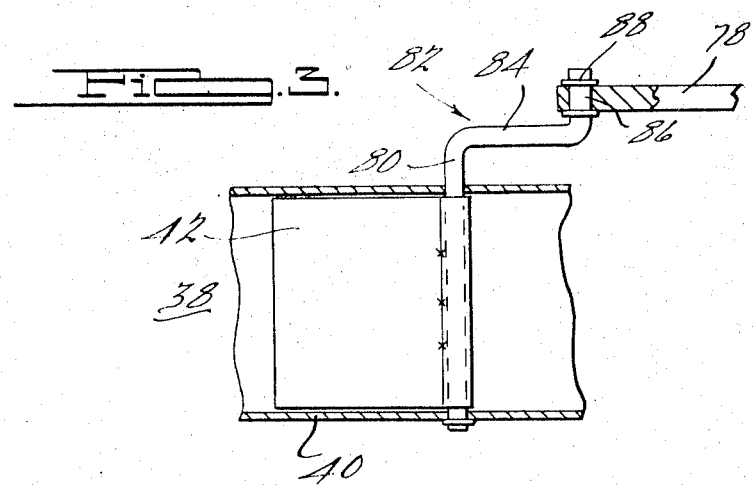
FIGURE 3 is an elevation view of the valve plate of FIGURE 1.

A fastener 76, such as a rivet or bolt, pivotally connects lever 70 to a connecting arm 78. The end of arm 78 remote from lever 70 is operatively connected to valve plate 42 as is best illustrated by FIGURES 3–5. Valve 42 is secured for movement to a shaft 80 of a crankshaft 82 having throw 84 and crank arm 86 (FIG. 3). Shaft 80 is journalled at one end thereof in duct work 40. The end of arm 78 remote from lever 70 is pivotally connected to crank arm 86 at point 88 so that pivotal movement of lever 70 results in a corresponding pivotal movement of valve plate 42.

Bowden wire 64, lever 70, connecting arm 78 and crankshaft 82 constitute a mechanical linkage interconnecting temperature control lever 62 and valve plate 42. This linkage is adjustable to vary the ratio of valve plate movement to lever movement upon the activation of linkage adjustment means to be described below.

A second operating lever 90 is pivotally secured to post 63 of bracket 58 and has one end thereof extending through slot 54 of panel 50. This lever is operatively connected to an electric switch (not illustrated) that activates cooling means or condenser 24 upon movement of lever 90 to the left of the "OFF" position as viewed in FIGURE 2. The end of lever 90 remote from passenger compartment 16 is pivotally connected at 92 to a connecting arm 94. The end of arm 94 remote from lever 90 is pivotally connected at 96 to a control arm 98 of a pressure valve 100. The valve 100 interconnects a vacuum source 102 and a vacuum conduit 104. The mechanical connection between lever 90 and valve 100 is such that when the former is moved to the left of the "OFF" position to actuate cooling means or condenser 24, valve 100 is opened to admit vacuum to conduit 104.

Conduit 104 applies the vacuum from source 102 to a conventional vacuum motor 106 that is secured to lever 70 for movement therewith by fasteners 108. A resilient diaphragm 110, movable within the confines of motor 106 upon activation and deactivation of said motor, is secured to an operating rod 112.

Figure 6:
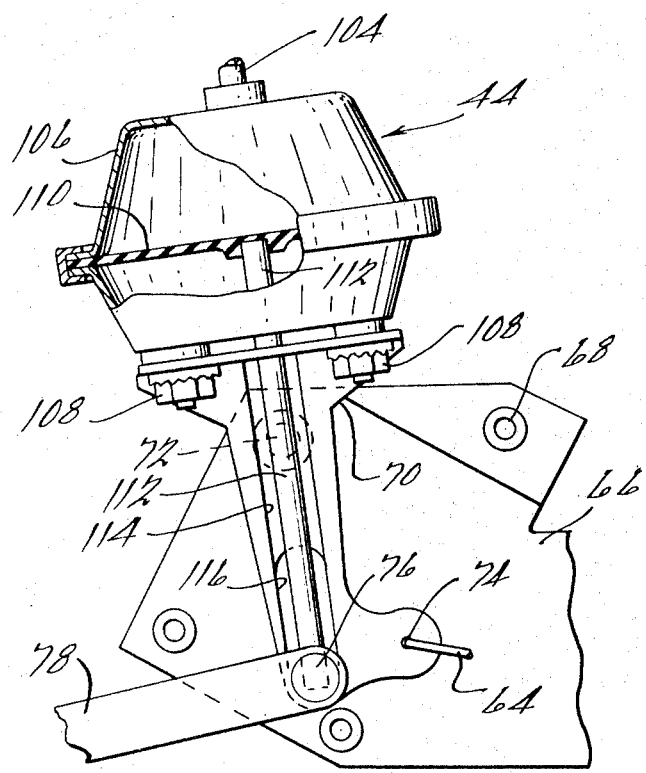
FIGURE 6 is an enlarged view of a portion of the apparatus of FIGURES 4 and 5 and illustrating in detail the adjustable linkage feature of this apparatus.

From FIGURE 6 it may be seen that lever 70 has a groove 114 extending along a portion of its length. Rod 112 extends through the outer wall of motor 106 and is positioned in groove 114 with its end that is remote from motor 106 secured to the fastener 76, said fastener pivotally connecting lever 70 and connecting arm 78. This fastener is positioned within an elongated aperture 116 formed through lever 70 that permits freedom of movement of fastener 76 along a portion of the length of lever 70 corresponding to the length of aperture 116.

FIGURE 4 illustrates the orientation of the temperature control device during periods when heated air is desired within passenger compartment 16. Lever 90 is not located to the left of the "OFF" position so the air cooling means 24 is inoperative and valve 100 is closed. The resiliency of diaphragm 110 holds rod 112 in an extended position so that fastener 76 is located at the outer extremity of aperture 116. The effective length of lever 70 thus is the distance between pivot point 72 and the outer extremity of aperture 116.

With the temperature control device in such an orientation, movement of lever 62 from the "MIN" to "MAX" positions results in a corresponding movement of crank arm 86 from the "MIN" to "MAX-HEATER" positions identified in FIGURE 4. Thus valve plate 42, moving in response to movements of crank arm 86, may be moved through a range of positions corresponding to the desired range of air temperatures during heating periods. The possible movement of lever 62 over the full length of slot 52 provides for a satisfactory fine adjustment characteristic for this control when heated air is desired.

FIGURE 5 illustrates the orientation of the parts shown when air cooling is desired. Lever 90 has been moved to the left of the "OFF" position as viewed in FIGURE 3, resulting in the actuation of air cooling means 24 and the opening of valve 100. Vacuum from source 102 thus acts on diaphragm 110 to overcome the resiliency of the diaphragm and urge both the diaphragm and rod 112 inwardly. Fastener 72 thus is positioned at the inner extremity of aperture 116 and the effective length of lever 70 is reduced since fastener 76 is drawn closer to pivot point 72.

Movement of lever 62 from the "MIN" to "MAX" positions now results in a smaller movement of crank arm 86 from the "MIN" to "MAX-AC" positions illustrated. Movement of valve plate 42 corresponding to this movement of crank arm 86 encompasses all positions of the valve plate for obtaining cooled air within the desired temperature range. Full movement of lever 62 to obtain cooled air within the desired temperature range provides for a satisfactory fine adjustment of this control during air cooling periods and allows the vehicle operator to set lever 62 at an acceptable position with a minimum of lever position experimentation.

It thus may be seen that this invention provides a climate control system for a motor vehicle including continuously operable air heating means and intermittantly operable air cooling means and wherein the fine adjustment characteristic of the temperature control lever is satisfactory and similar during both air heating and air cooling periods.

It is to be understood that this invention is not limited to the exact construction illustrated and described above or the abstract preceding this specification, but that various changes and modifications may be made without departing from the spirit and scope of the invention as defined by the appended claims.

I claim:

1. In a motor vehicle climate control system, duct means defining a first air passage having air heating means positioned therein and a second air passage having air cooling means positioned therein, each of said passages being interconnected with a common source of pressurized air, valve means secured to said duct means and regulating the flow of air through each of said passages, said valve means including a movable valve plate, a manually operable valve control lever, adjustable linkage means interconnecting said valve control lever and said valve plate and having a first position such that a predetermined movement of said valve control lever causes a first movement of said valve plate, and adjustment means manually operable to adjust said linkage means to a second position such that said predetermined movement of said valve control lever causes a second movement of said valve plate, said first and second valve plate movements differing in magnitude.

2. The apparatus of claim 1, wherein said second valve plate movement is less than said first movement.

3. The apparatus of claim 2, wherein said air cooling means has an operable condition and an inoperable condition, said adjustment means including switch means controlling the condition of said air cooling means and operably connected to said linkage means such that said linkage means is urged into the second position upon said air cooling means being in the operable condition.

4. The apparatus of claim 1, wherein said linkage means includes a pivotally movable link, said valve plate operatively secured to said link by fastening means at a point of attachment spaced from the pivot point of said link, said fastening means being movable along said link relative to said pivot point.

5. The apparatus of claim 4, wherein said second valve plate movement is less than said first movement.

6. The apparatus of claim 5, wherein said adjustment means are operably secured to said fastening means, said fastening means being positioned proximate to said pivot point when said linkage means are in the second position and remote from said pivot point when said linkage means are in the first position.

7. The apparatus of claim 6, wherein said air cooling means has an operable condition and an inoperable condition, said adjustment means including switch means controlling the condition of said air cooling means and operably connected to said linkage means such that said linkage means is urged into the second position upon said air cooling means being in the operable condition.

8. The apparatus of claim 7, wherein said adjustment means further includes a motor means operatively connected to said fastening means to move the latter, said switch means operatively connected to said motor means to activate said motor means upon activation of said air cooling means.

9. A motor vehicle climate control system for use in a motor vehicle having body structure defining a passenger compartment, said climate control system adapted to convey air to said compartment and control the temperature of air entering said compartment, said climate control system including: air input conduit means through which air enters said climate control system; first and second air passage means communicating between said conduit and said compartment; air heating means and air cooling means positioned in said system such that air passing through said first passage means may be heated and air passing through said second passage means may be cooled; movable valve means operatively positioned in said passage means and controlling the volume of air passing through each of said passage means; said valve means having a first position wherein all air passing through said conduit means is directed through said first passage means, a second position wherein all air passing through said conduit means is directed through said second passage means and an infinite number of positions between said first and second position; a manually operable cooling means actuating switch positioned in said passenger compartment and operable to activate and deactivate said cooling means; and air temperature control means comprising a manually operable temperature control switch positioned in said passenger compartment and connected by a mechanical coupling to said valve means such that upon a movement of said temperature control switch said valve means will move a first predetermined distance, and coupling alteration means interconnecting said coupling and said cooling means actuating switch and altering said coupling upon actuation of said cooling means such that upon said movement of said temperature control switch said valve means will move a second predetermined distance that is less than said first predetermined distance.

10. Apparatus according to claim 9, wherein said coupling comprises a pivotally movable lever the effective length of said lever being adjustable, said coupling alteration means including a vacuum motor connected to said lever and operable to alter the effective length of said lever, a vacuum source connected to said motor and second valve means controlling the application of vacuum to said motor and operatively connected to said cooling means actuating switch.

References Cited

UNITED STATES PATENTS

| | | | |
|---|---|---|---|
| 1,986,863 | 1/1935 | Terry | 165—30 |
| 3,404,835 | 10/1968 | Rodgers | 165—23 |

ROBERT A. O'LEARY, *Primary Examiner.*

U.S. Cl. X.R.

165—30, 122